United States Patent [19]
McCaffrey

[11] Patent Number: 5,949,918
[45] Date of Patent: Sep. 7, 1999

[54] METHOD AND APPARATUS FOR PERFORMING IMAGE ENHANCEMENT

[75] Inventor: Nathaniel Joseph McCaffrey, Lambertville, N.J.

[73] Assignee: Sarnoff Corporation, Princeton, N.J.

[21] Appl. No.: 08/912,660

[22] Filed: Aug. 18, 1997

Related U.S. Application Data

[60] Provisional application No. 60/047,278, May 21, 1997.

[51] Int. Cl.$^6$ ..................................................... H04N 1/40
[52] U.S. Cl. ........................... 382/274; 358/520; 358/518
[58] Field of Search ..................................... 358/518, 520, 358/447; 382/254, 274, 271, 162, 167

[56] References Cited

U.S. PATENT DOCUMENTS

| | | | |
|---|---|---|---|
| 4,731,671 | 3/1988 | Alkofer | 358/284 |
| 4,755,954 | 7/1988 | Netter | 364/518 |
| 5,042,077 | 8/1991 | Burke | 382/51 |
| 5,296,941 | 3/1994 | Izawa et al. | 358/458 |
| 5,481,620 | 1/1996 | Vaidyanathan | 382/169 |
| 5,544,258 | 8/1996 | Levien | 382/169 |
| 5,680,230 | 10/1997 | Kaburagi et al. | 358/520 |

Primary Examiner—Thomas D. Lee
Assistant Examiner—Stephen Brinich
Attorney, Agent, or Firm—William J. Burke

[57] ABSTRACT

A method and apparatus for processing an image stream to enhance a parameter of the image. The image stream comprises a plurality of picture elements (pixels), each of which include a characteristic related to the image parameter to be enhanced. The pixels are processed according to a controllable function to produce a processed image stream. A statistical distribution of the pixel characteristic of interest is determined, optimized and used to generate control information to modify the operation of the controllable function.

16 Claims, 4 Drawing Sheets

METHOD AND APPARATUS FOR PERFORMING IMAGE ENHANCEMENT

This application claims the benefit of U.S. Provisional Application No. 60/047,278, filed May 21, 1997.

The invention relates to image processing systems and, more particularly, the invention relates to a method and apparatus for performing image enhancement.

BACKGROUND OF THE DISCLOSURE

Surveillance imaging systems traditionally use off-the-shelf general-purpose imagers for video acquisition. A luminance channel in the imager provides a luminance signal having a dynamic range that is large enough to convey a scene to a viewer. The luminance channel is normally limited by an automatic iris lens setting. A scene comprising dark foreground and a bright background is both common and problematic. In such a scene, the detail in the foreground is often limited to a few brightness or intensity levels near the bottom of the luminance channel dynamic range, while the objects in the background are crowded into a few levels near the top. When viewed on a monitor, little information can be extracted from this scene. Automatic luminance channel gain circuits may be used to improve the contrast in the brightest portions of the scene, though usually at the expense of the darker portions.

Therefore, a need exists in the art for a method and apparatus for performing improved contrast enhancement.

SUMMARY OF THE INVENTION

The present invention is an apparatus and method for dynamically increasing contrast in all parts of an image to provide a maximum contrast enhancement. In a first embodiment of the invention, a processing function, comprising a lookup table, remaps each pixel in an image-representative input video stream to produce an output video stream. The image-representative input video stream is statistically analyzed to determine a global luminance distribution of the image. A set of remapping coefficients which optimize the determined distribution is generated and periodically inserted into the lookup table. The processing function operates in substantially real-time while the generation of lookup table coefficients and the insertion of the generated coefficients into the lookup table is performed at a slower rate. In another embodiment of the invention, the inventive apparatus uses motion detection to identify portions of the image which may include more important details, i.e., "significant" portions. The significant portions of the image are emphasized by increasing the statistical weight of the luminance levels associated with the significant portions prior to generating the lookup table coefficients.

More generally, a digitized video signal representing an image is subjected to an adaptive pixel-by-pixel processing function to maximize a parameter of the image. A profile of the image parameter is statistically determined and a set of processing function coefficients which optimize the determined distribution is generated and used to modify the processing function. The pixel-by-pixel processing is performed at a video rate, while the generation of coefficients and the modification of the processing function is performed at a slower rate.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
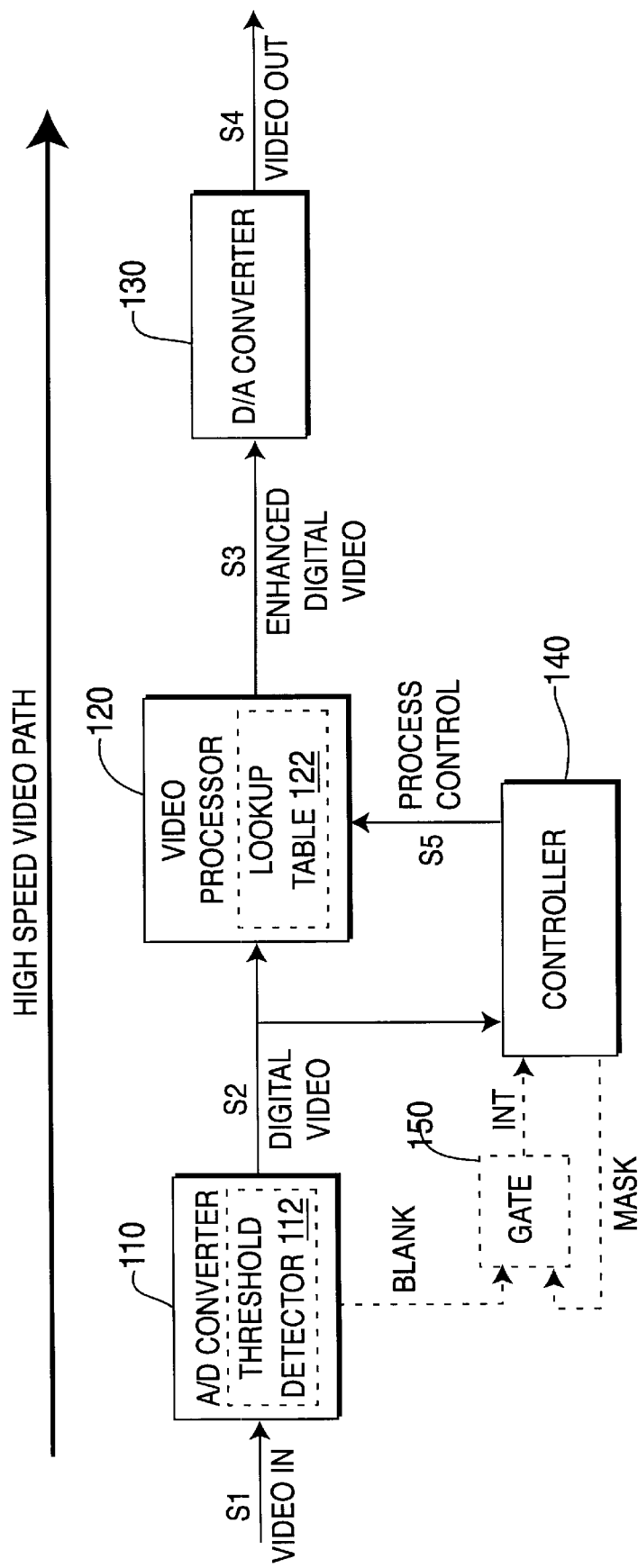
FIG. 1 shows a block diagram of a video processing system according to the invention.

FIG. 1 shows a block diagram of a video processing system according to the invention. An analog video signal, illustratively a baseband (e.g., RGB or Y/C) or composite video signal S1 is digitized in a known manner by an analog-to-digital (A/D) converter 110 to produce a digital video stream S2. The digital video stream S2, illustratively an 8-bit (i.e., 256 intensity level) video stream comprising a sequence of picture elements (pixels), is coupled to a video processor 120 and a controller 140. The video processor 120 processes each pixel in the digital video stream S2 according to a controllable function to produce an enhanced digital video stream S3, illustratively a contrast-enhanced video stream. The enhanced digital video stream S3 is converted to an analog video output signal S4 in a known manner by a digital-to-analog (D/A) converter 130. The controller 140 analyses the digital video stream S2 to determine a global luminance distribution and, based on that distribution, provides enhancement function control information S5 to the video processor 120. Various image parameters may be enhanced, including contrast, color balance, sharpness and the like. Moreover, the controllable function may comprise a lookup table (LUT) or any controllable combination of linear or non-linear video processing elements (e.g., adders, subtractors, multipliers, LUTs, gamma correctors and the like). In the case of a composite signal, it is desirable for the video processing system of FIG. 1 to update the LUT 122 only during vertical blanking.

In a video application, the standard video output signal from a video cassette recorder (VCR) or camera typically has about 8-bits of luminance channel dynamic range (i.e., 256 gray scale or intensity levels). Typical video display devices also have 8-bits of luminance channel dynamic range. Images with low contrast do not utilize all 256 intensity levels and, therefore, the resulting picture is crowded into a few brightness levels. An embodiment of the invention described below utilizes histogram processing to adaptively modify the global brightness distribution using nonlinear mapping such that substantially the entire luminance channel dynamic range of the display device is used.

In the embodiment of FIG. 1, video processor 120 includes a lookup table (LUT) 122, illustratively a 256-bit by 8-bit random access memory (RAM). The LUT 122 includes one tabular entry associated with each of the 256 possible pixel intensity levels (i.e., 8-bit pixels). The video processor 120 processes each received pixel in accordance with the tabular entry associated with the intensity level of the received pixel. Thus, the video processor 120 transforms the image data by mapping input pixel intensity levels of digital video stream S2 to output pixel intensity levels to form digital video stream S3. For example, if the values 0–255 were stored in respective memory locations 0–255 of LUT 122, then the "enhanced" digital video stream S3 would be identical to the digital video stream S2. That is, each pixel in the digital video stream S2 would be replaced by a pixel having the same intensity level. The contents of the LUT 122 are determined by the controller 140.

The controller 140 derives image information by subsampling the digital video stream S2 and processing the resulting subsampled video signal. The controller 140 produces a processing control signal S5 which is coupled to the video processor. In response to the processing control signal S5, video processor 120 modifies the contents of the LUT 122 such that the processed video output stream S3 utilizes a maximal luminance channel dynamic range (in the case of contrast enhancement). The pixel-by-pixel processing of video processor 120 is performed substantially in real-time (i.e., at a video rate). A HIGH SPEED VIDEO PATH comprising the A/D converter 110, the video processor 120 and the D/A converter 130 is shown in FIG. 1. However, it is important to note that the statistical processing of the digital video stream S2 and the generation of enhancement function control information (i.e., processing control signal S5) may be performed at a slower rate. Thus, the controller 140 may be implemented using slower, low price microprocessor or digital signal processing devices and techniques. The inventor also notes that careful selection of the function used for enhancement control will allow fixed point control processing. An example of a preferred control processing method will now be described.

The controller 140 utilizes a statistical processing method which will be described in more detail below with respect to FIG. 2, FIG. 3A and FIG. 3B. Briefly, the digital video stream S2 is subsampled by the controller 140 over a predetermined time period or for a predetermined number of samples. The time period or number of samples is ideally chosen to maximize the correlation of contrast information in the subsampled data to the actual contrast information in the digital video stream. The inventor has determined that a subsampling rate of one sample per twenty pixels is sufficient to accurately determine a global luminance level of an image. The subsampling rate is related to the speed of the controller 140 and the image parameter to be enhanced. The subsampled image data is denoted as a "frame" of data (i.e., a "sample frame").

Controller 140 uses a histogram to count the number of occurrences of each of N possible intensity or gray levels. The histogram is denoted as a discrete vector having N possible intensities (i.e., "bins") and M number of pixels in each bin. Each bin should be able to hold the total number of pixels in the sample frame. At the end of the sample frame, the histogram is examined to determine a distribution of pixels in each gray level and the occurrence of any empty bins. The distribution of pixels represents the global luminance distribution of the image.

Figures 3A, 3B:
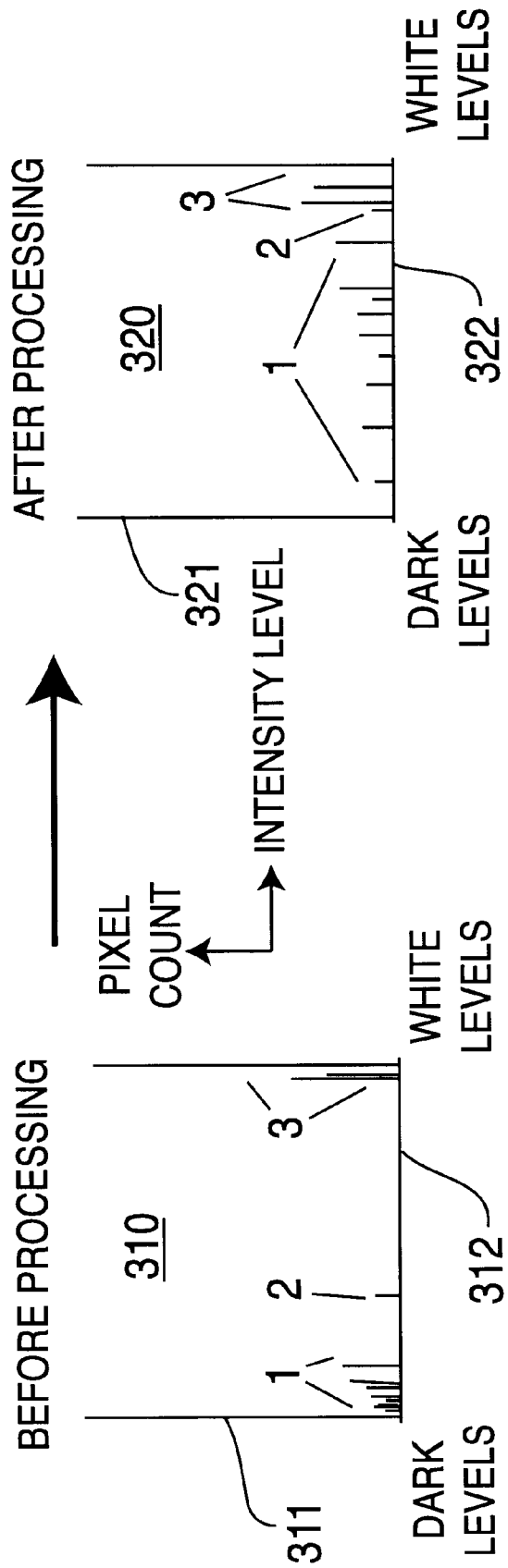
FIG. 3A shows a histogram representing the global luminance distribution of an image.
FIG. 3B shows a histogram representing the global luminance distribution of the image of FIG. 3A after processing by the invention.

FIG. 3A shows a histogram 310 representing the global luminance distribution of an image before processing by the invention. FIG. 3B shows a histogram 320 representing the global luminance distribution of the image after processing by the invention. The x-axis 312,322 represents the 256 different possible pixel intensity levels of an 8-bit video signal. The lowest possible level is zero (black) and the highest possible level is 255 (white). The y-axis 311,321 represents the number of pixels at each intensity level. The image represented by FIG. 3A includes one or more pixels (group "1") at nine different "dark" intensity levels, one or more pixels (group "2") at a single "medium" intensity level and one or more pixels (group "3") at two different "white" intensity levels. The first group includes many pixels which are at or near the same intensity level. Thus, the contrast between members of the same group (i.e., intra-group contrast) is quite low. The third group also suffers from low intra-group contrast. However, the contrast between the first and third groups (i.e., inter-group contrast) is quite high. It can be seen that the post-processing global luminance distribution of FIG. 3B provides a more desirable "spacing" between the various intensity levels, thereby providing improved contrast between members of the same group (i.e., intra-group contrast) at the expense of a minor decrease in contrast between groups (i.e., inter-group contrast).

A histogram equalization method utilized by the invention will now be described. In histogram equalization, from the raw histogram (e.g., FIG. 3A), a cumulative distribution function (CDF) is calculated which represents the total number of sampled pixels at or below a bin (i.e., intensity level) currently being examined. The CDF function may be mathematically shown below as equation 1:

$$CDF(N) = \sum_{j=0}^{N} hist(j) \qquad \text{(eq. 1)}$$

The last CDF data point (i.e., the $N^{th}$ point) represents the total number of sampled pixels. Each non-zero bin is then mapped by dividing the CDF of the non-zero bin by the final (i.e., $N^{th}$) CDF value and scaled appropriately to the display dynamic range (8-bits, or 256 levels in the example). The scaling operation is shown below as equation 2:

$$Vid_{out}(N) = 255 * \left( \frac{CDF(N)}{CDF(255)} \right) \qquad \text{(eq. 2)}$$

Since division operations in hardware are time consuming tasks (e.g., typically taking 10 to over 100 instruction cycles to perform), it is desirable to reduce or remove the need to perform division operations. The floating point divide operation of equation 2 may be removed by constraining the number of samples CDF(255) in a sample frame to 65535. With this constraint, the equation 2 is reduced to equation shown below as equation 3:

$$Vid_{out}(N) = \frac{255}{65535} * CDF(N) = (CDF(N) \gg 8) \qquad \text{(eq. 3)}$$

The operation performed by equation 3 is reducible to a single instruction cycle operation (i.e., rotate right 8 positions) on a typical microprocessor or digital signal processor (DSP). Thus, the controller 140 may perform relatively rapid processing of subsampled data without using floating point or divide operations. As previously noted, this allows the use of an inexpensive DSP or microprocessor.

Figure 2:
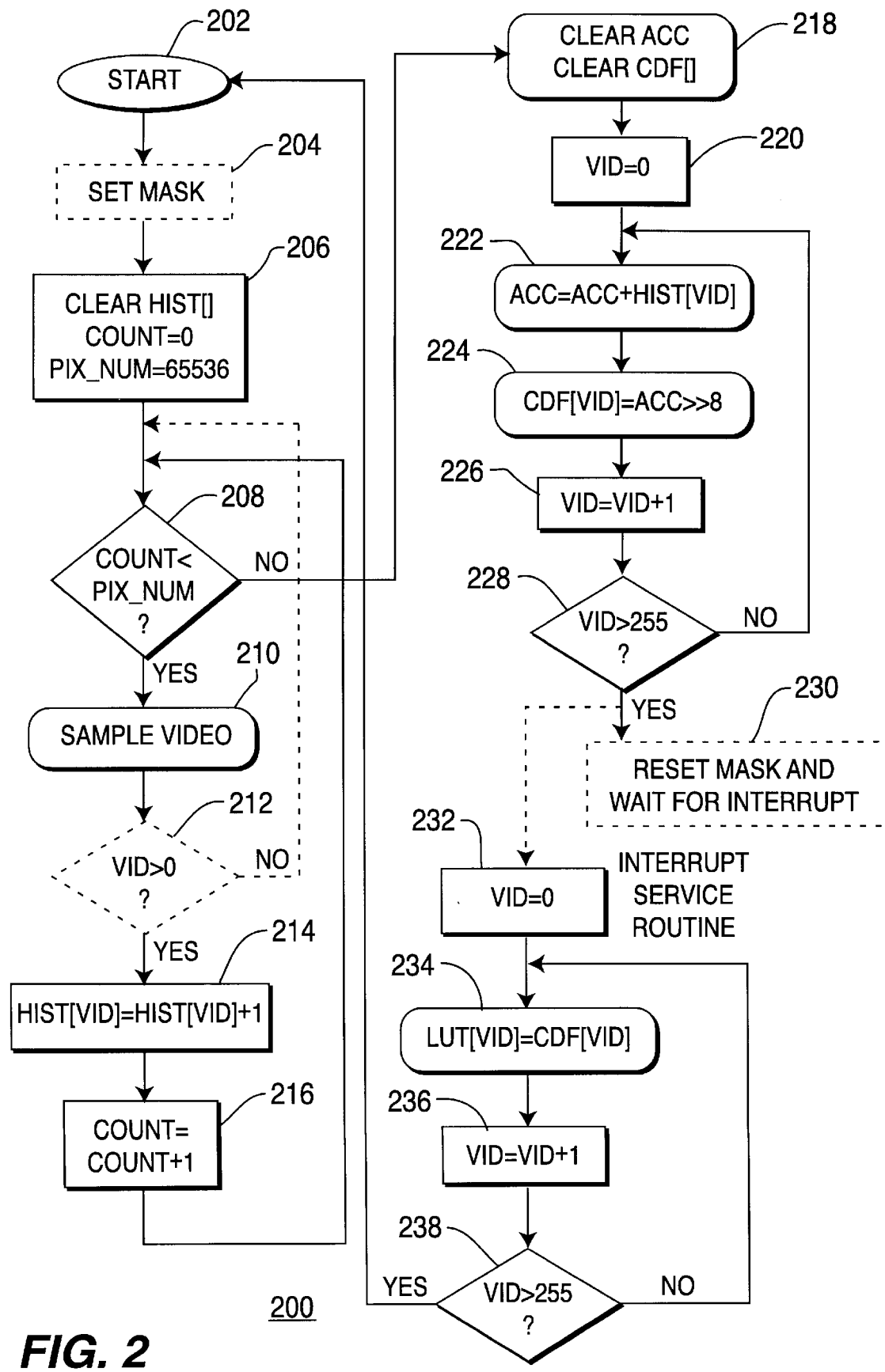
FIG. 2 shows a flowchart useful in understanding the invention.

A method of performing the histogram equalization method utilized by the invention is shown in flowchart of FIG. 2. The routine of FIG. 2 is an interrupt driven routine 200 performing the steps of determining a histogram (steps 202–216) of intensity levels of a subsampled video stream; equalizing the determined histogram (steps 218–228) to determine appropriate remapping values; and updating a lookup table using the appropriate remapping values (steps 232–238). It should be noted that the lookup table updating steps (232–238) are implemented in an interrupt servicing routine. This routine is called during, e.g., a vertical blanking interval of the digital video stream S2. By using the interrupt driven routine described below, the controller 140 may be synchronized (or "genlocked") to the input video signal S1. In a non-interrupt driven system, an interrupt mask would not be set (step 204) or reset (step 230).

The routine 200 is entered at step 202. At step 204, an interrupt mask is set if the routine is operating within an interrupt driven system. The interrupt mask instructs the controller 140 to ignore interrupts to prevent disruption of the histogram determination process. At step 206, each element in a memory array HIST is cleared, a counter COUNT is initialized to zero, and a variable PIX_NUM is initialized to 65535. The memory array HIST will be used to store a histogram representing the global luminance distribution of a sample frame of video data. The memory array HIST will be indexed by the number of possible intensity levels of the digital video stream S2 (256 in the exemplary embodiment). The variable PIX_NUM represents the total number of pixels in a sample frame.

Digital video stream S2 is sampled (step 210) and the intensity level of the sampled pixel is stored in a variable VID. In the exemplary embodiment, VID is between zero (black) and 255 (white). If blanking pulses are represented by an intensity level of zero, then samples having an intensity level of zero may be excluded from the histographic data by optional step 212. If blanking pulses (and other non-image data in the digital data stream S2) have been previously removed (i.e., the data stream S2 includes only image data), then step 212 should not be implemented.

The element in the array HIST that stores a number representing the number of pixels having the same intensity level of VID is incremented at step 214. The counter COUNT is also incremented (step 216). Steps 210–216 are repeated until an entire sample frame of data is sampled and a histogram representing the luminance distribution of the sample frame is stored (i.e., while COUNT is less than PIX_NUM (step 208).

After the routine 200 determines the histogram representing the luminance distribution of digital video stream S2 (steps 202–216), the histogram equalization routine is entered at step 218. An accumulator ACC and each element in a cumulative distribution function memory array CDF are cleared (step 218). A memory array index VID is also set to zero (step 220).

The element of the determined histogram HIST indexed by the memory array index VID (i.e., the VID$^{th}$ element in the array HIST) is added to the contents of the accumulator ACC (step 222). The accumulator ACC is then rotated right by eight bits (i.e., divided by 256) and stored as the VID$^{th}$ element of the cumulative distribution function memory array CDF (step 224). The memory array index VID is then incremented (step 226). Steps 222–226 are repeated until the memory array index VID is greater than 255 (i.e., until each possible intensity level in the histogram has been operated upon).

In an interrupt driven system, the interrupt mask set at step 204 is reset and the controller 140 waits for an interrupt (step 230). Upon receiving an interrupt, the interrupt service routine (steps 232–238) is entered. In a non-interrupt driven system, step 232 is performed immediately after step 232. The interrupt may be generated by gating a signal indicative of a vertical blanking interval BLANK with an interrupt mask MASK, as will be explained below.

The first step (step 232) of the lookup table updating steps (232–238) sets the memory array index VID to zero. The controller 140 causes each element of the lookup table 122 in processor 120 to be updated with the value stored in the corresponding element of the memory array CDF (steps 234–238). In the exemplary embodiment, the lookup table 122 and the memory array CDF have 256 elements which correspond to the 256 possible intensity levels of an 8-bit digital video system.

It is desirable for the video processing system of FIG. 1 to update the LUT 122 only during vertical blanking to avoid using dual port memory in the LUT and to avoid visual artifacts which may be caused by inter-frame (in this case inter "image-frame") changes in the luminance distributions of an image-frame of video. The desired synchronization may be implemented in several ways. Two of the synchronization methods favored by the inventor will now be discussed.

First, as previously discussed with respect to FIG. 2, a zero intensity level may be used to represent a blanking or "ultra-black" pulse. This may be accomplished by inserting an analog "sync-tip" clamp (not shown) prior to the A/D converter 110. The analog sync-tip clamp sets the DC level of the tip of a synchronizing pulse (i.e., blanking pulse) to a known value with respect to the ground or zero reference of the A/D converter 110. A digital sync-tip clamp (not shown) within A/D converter 110 may also be implemented. The digital sync-tip clamp tracks the lowest signal level (i.e., sync pulse level) and adjusts the ground or zero reference to the tracked level. In either case, the most negative level of the analog input video signal S1 (i.e., the sync-tip) is used to set the zero or ground reference of the A/D converter 110.

Second, a hardware interrupt may be implemented to facilitate system synchronization. As shown in FIG. 1, an optional threshold detector 112 within the A/D converter 110 detects video signal excursions below a predetermined level representative of a blanking pulse. The output of threshold detector 112 BLANK and an interrupt masking signal MASK produced by controller 140 are logically ANDed together by AND gate 150 to produce an interrupt signal INT. The masking signal MASK is active high and indicates that the controller is performing the histogram determining portion (steps 202–216) or histogram equalization portion (steps 218–230) of the routine of FIG. 2. The output of AND gate 150 is coupled to the controller 140 as an interrupt signal INT. Thus, an interrupt routine (per FIG. 2) is driven by signals derived from both the controller 140 (e.g., a digital signal processor or DSP) and the input video signal S1. After completing the histogram equalization portion (steps 218–230) of the routine of FIG. 2, the controller sets the masking signal MASK low (step 230) and goes into an idle mode waiting for the next vertical blanking signal which is now gated through. The interrupt servicing routine (i.e., steps 232–238) must finish before active video and the masking signal MASK is set again.

It is important to note that the controller 140 of the video processing system of FIG. 1 is able to run at a much slower rate than the video processor 120. The digital video stream S2 is processed in real-time by video processor 120 by, e.g., remapping the pixel data within digital video stream S2 using LUT 122. However, the update rate of LUT 122 and the instruction execution time of the controller 140 may be significantly slower (e.g., 20 times) than the pixel rate of digital video stream S2. Thus, the algorithm timing of the invention is much less critical than in prior art video pipeline processing approaches. It should be noted that the invention may be practiced using algorithms and routines other than the exemplary routine described in FIG. 2.

The inventor has determined that it is sometimes desirable to enhance the contrast of certain areas within an image more than other areas. For example, in a security monitoring application utilizing a stationary camera, a moving portion of the recorded image may be of greater interest to security personnel. Therefore, it is desirable to implement prioritized contrast enhancement based on motion in an image. An implementation of such a prioritized contrast enhancement will now be described.

Figure 4:
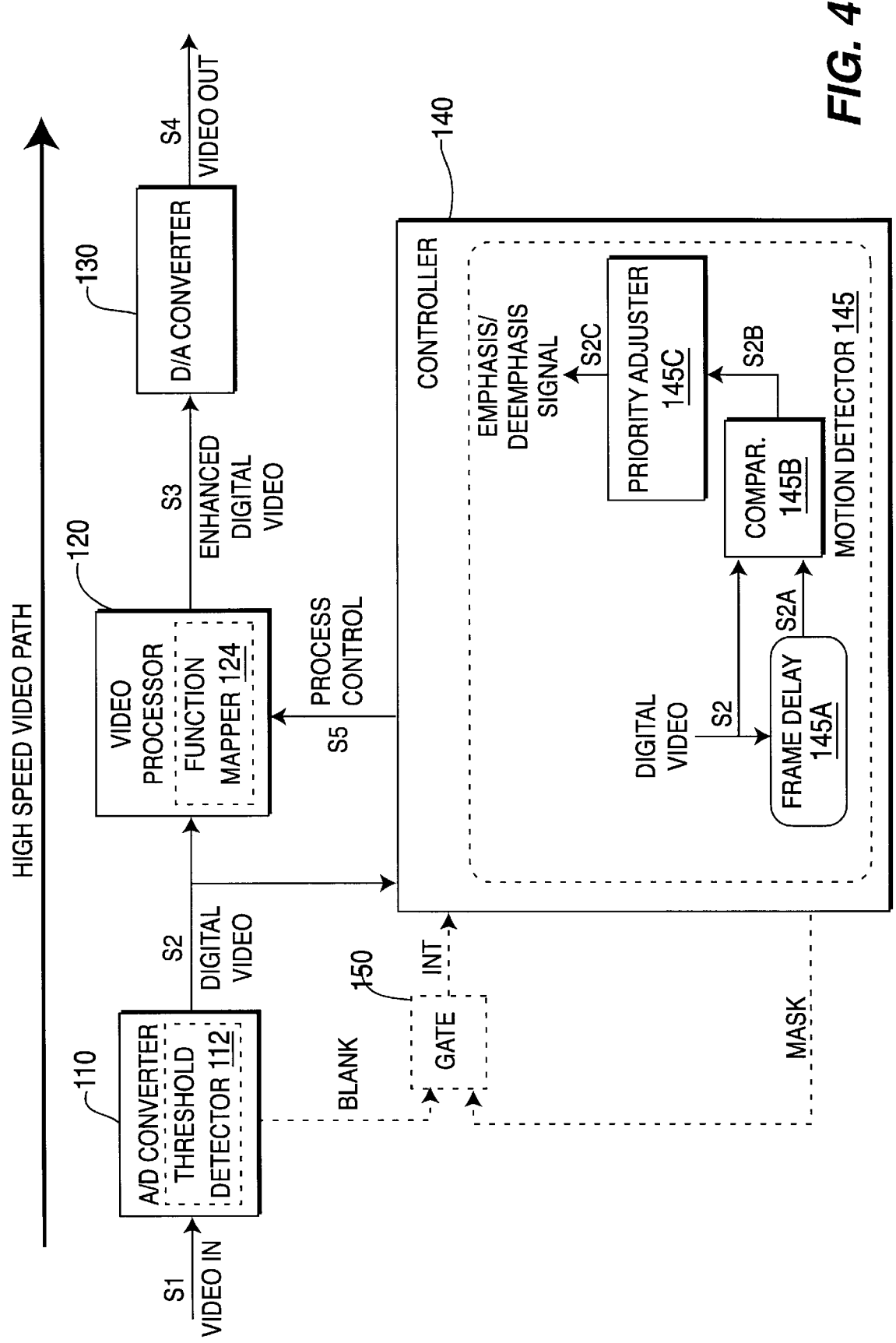
FIG. 4 shows a block diagram of a video processing system according to the invention and including a motion detector.

FIG. 4 shows a block diagram of a video processing system according to the invention and including a motion detector 145. Since portions of the video processing system of FIG. 4 operates in substantially the same manner as corresponding portions of the video processing system of FIG. 1, only the differences between the two video processing systems will be described.

Motion detector 145 includes frame delay 145A, a comparator 145B, and a priority adjuster 145C. Digital video stream S2 is coupled to the frame delay 145A which operates in a known manner to produce a frame-delayed digital video stream S2A. The frame-delayed digital video stream S2A is delayed by an integer multiple of image frames from the digital video stream S2. If the integer multiple is one, then image represented by the frame-delayed digital video stream S2A is simply the video frame (i.e., "image frame") immediately preceding the image represented by the digital video stream S2. Frame delays of more than one frame (i.e., an integer multiple greater than one) may be used, depending on the amount of motion expected. It is only necessary that the comparator 145B compares pixels having the same position in an image frame.

The comparator 145B receives the digital video stream S2 and the frame-delayed digital video stream S2A. If the two signals are equivalent in terms of intensity level, then there has likely been no image motion involving that particular pixel. If the two signals are different, then there likely has been image motion involving that pixel from one image frame to the next. Comparator 145B produces an output signal S2B indicative of image motion.

The priority adjuster 145C receives the motion indicative signal S2B and the digital video stream S2. In response to the motion indicative signal S2B, priority adjuster 145C emphasizes or de-emphasizes a particular pixel associated with the motion by respectively increasing or decreasing the number of counts associated with the intensity level of the pixel to produce an emphasis/deemphasis signal S2C. For example, if a motion-associated pixel has an intensity level of 50, then the count stored in the 50th element in the determined histogram (i.e., HIST[50] in the routine of FIG. 2) is incremented (to emphasize) or decremented (to de-emphasize) by one or more counts by the controller 140. Thus, the resulting determined histogram (e.g., HIST[O]-HIST[255]) will have more or less counts of pixel intensity levels which have been, respectively, emphasized or de-emphasized. In this manner, portions of an image which move may be subjected to a higher or lower degree of contrast processing in response to a motion processing.

In addition to the motion-related emphasis and de-emphasis, the controller 140 may also prioritize pixels based on their position within an image. For example, if the security camera presented above includes a portion of constant motion within its field of view (e.g., a busy intersection), then motion processing will probably not yield satisfactory results. In this case positional de-emphasis may be implemented. Positional de-emphasis is the removal or reduction of histographic luminance data related to pixels occupying the portion of an image having undesirable motion or other attributes. Positional de-emphasis may be incorporated into the controller 140 of the systems of FIG. 1 and FIG. 4.

A further modification to the video processing system is the optional use of a function mapper 124 instead of a lookup table. The function mapper may be any known video processing function or combination of functions (e.g., adders, subtractors, multipliers, LUTs and the like). In the case of a color signal it might be desirable to perform a color-related processing function such as color balancing or color saturation adjustment in addition to, or instead of, a luminance processing function. Color processing functions and other video processing functions are intended to be within the scope of the invention.

The above-described embodiments of the invention provide a means to exploit the full bandwidth of, e.g., display devices, to extract the maximum amount of information from a video signal. The invention has broad applicability to surveillance, medical and scientific imagery applications in addition to video applications. In addition, video and other images may be enhanced prior to lossy tape recording to enhance the detail during later playback.

The inventor constructed a single board video processing system according to FIG. 1 to perform frame type adaptive processing on analog signals up to 10 MHz. The constructed system was designed to operate with standard NTSC video and required no extra sync or clock signals. The constructed system used a small printed circuit board with surface mount components and had a total cost of less than $50US (1996). The cost savings were realized by using fixed point processing, the unique algorithm described above, a simple DSP interrupt locking scheme and the use of low rate processing outside of the video stream. For example, the controller 140 was implemented using a fixed-point, audio-quality (and speed) Texas Instruments TMS320C25 DSP chip and the LUT 122 was implemented using a 256 by 8 bit static random access memory chip having a 25 nanosecond access time. Prior art contrast enhancement video processing arrangements cost substantially more than the above-described invention.

Although various embodiments which incorporate the teachings of the present invention have been shown and described in detail herein, those skilled in the art can readily devise many other varied embodiments that still incorporate these teachings.

What is claimed is:

1. A method for processing an image stream to enhance a parameter of an image, said image comprising a plurality of picture elements (pixels), each of said pixels including a characteristic related to said image parameter, said method comprising the steps of:
  (a) processing each of said pixels of said image stream according to a controllable function to produce a processed image stream;
  (b) determining a statistical distribution of said pixel characteristic in said image stream, said statistical distribution representative of said parameter of said image;
  (c) generating at least one function coefficient for optimizing said determined statistical distribution; and
  (d) modifying said controllable function using said at least one function coefficient; wherein
  said controllable function is a remapping function and said at least one function coefficient is a lookup value.

2. The method of claim 1, wherein:
  said image parameter is a luminance parameter, said pixel characteristic is an intensity level, and one of N possible intensity levels are associated with each of said pixels, and wherein:

said step of determining a distribution of said intensity levels comprises the step of counting, for a predetermined number of pixels, the number of pixels having each of said N possible intensity levels.

3. The method of claim 1 wherein said step of generating one or more function coefficients comprises the steps of:

sequentially adding to an accumulator a determined pixel count representative of the number of pixels having an intensity level from a first intensity level to said Nth intensity level; and generating a function coefficient during each sequential addition by dividing the accumulated total by N.

4. A method for processing an image stream to enhance a parameter of an image, said image comprising a plurality of picture elements (pixels), each of said pixels including a characteristic related to said image parameter, said method comprising the steps of:

(a) processing each of said pixels of said image stream according to a controllable function to produce a processed image stream;

(b) determining a statistical distribution of said pixel characteristic in said image stream, said statistical distribution representative of said parameter of said image;

(c) generating at least one function coefficient for optimizing said determined statistical distribution; and (d) modifying said controllable function using said at least one function coefficient; wherein said step of determining further comprises the steps of:
identifying pixels within said image that represent motion within the image; and
emphasizing the statistical significance of said pixel characteristics associated with said identified pixels.

5. A method for processing an image stream to enhance a parameter of an image, said image comprising a plurality of picture elements (pixels), each of said pixels including a characteristic related to said image parameter, said method comprising the steps of:

(a) processing each of said pixels of said image stream according to a controllable function to produce a processed image stream;

(b) determining a statistical distribution of said pixel characteristic in said image stream, said statistical distribution representative of said parameter of said image;

(c) generating at least one function coefficient for optimizing said determined statistical distribution; and (d) modifying said controllable function using said at least one function coefficient; wherein said image parameter is a color parameter, said pixel characteristic is a color saturation level, and one of N possible color saturation levels are associated with each of said pixels, and wherein:

said step of determining a distribution of said color saturation levels comprises the step of counting, for a predetermined number of pixels, the number of pixels having each of said N possible color saturation levels.

6. The method of claim 5 wherein said step of generating one or more function coefficients comprises the steps of:

sequentially adding to an accumulator a determined pixel count representative of the number of pixels having an color saturation level from a first color saturation level to said Nth color saturation level; and generating a function coefficient during each sequential addition by dividing the accumulated total by N.

7. The method of claim 5, wherein said controllable function is a remapping function and said at least one function coefficient is a lookup value.

8. The method of claim 5, wherein said step of determining further comprises the steps of:

identifying pixels within said image that represent motion within the image; and
emphasizing the statistical significance of said pixel characteristics associated with said identified pixels.

9. Apparatus processing an image stream to enhance a parameter of an image, said image comprising a plurality of picture elements (pixels), each of said pixels including a characteristic related to said image parameter, said apparatus comprising:

a pixel processor, receiving said image stream at an input and producing a processed image stream at an output, said pixel processor processing each received pixel of said image stream according to a controllable function;

a controller, coupled to said pixel processor and receiving said digital video signal at an input, said controller determining a statistical distribution of said pixel characteristic in said image stream and generating at least one function coefficient for optimizing said determined statistical distribution;

a motion detector, receiving said image stream at an input and producing an indicium of detected motion at an output, said motion detector identifying pixels within said image stream that represent motion within the image; and a priority adjuster, coupled to said motion detector, for emphasizing the statistical significance of said pixel characteristics associated with said pixels within said image stream that represent motion within the image;

said pixel processor, in response to a control signal from said controller, modifying said controllable function using said at least one function coefficient.

10. The apparatus of claim 9, wherein said image parameter and said pixel characteristic comprises either a luminance parameter and a respective intensity level, or a color parameter and a respective color saturation level;

one of N possible intensity levels or color saturation levels are associated with each of said pixels, and said controller determines said distribution of said intensity levels or color saturation levels by counting, for a predetermined number of pixels, the number of pixels having each of said N possible intensity levels or color saturation levels.

11. The apparatus of claim 9, wherein said controller generates said one or more function coefficients by sequentially adding to an accumulator a determined pixel count representative of the number of pixels having a color saturation level from a first color saturation level to said Nth color saturation level, said controller generating a function coefficient during each sequential addition by dividing the accumulated total by N.

12. Apparatus processing an image stream to enhance a parameter of an image, said image comprising a plurality of picture elements (pixels), each of said pixels including a characteristic related to said image parameter, said apparatus comprising:

a pixel processor, receiving said image stream at an input and producing a processed image stream at an output, said pixel processor processing each received pixel of said image stream according to a controllable function; and a controller, coupled to said pixel processor and receiving said digital video signal at an input, said controller determining a statistical distribution of said pixel characteristic in said image stream and generating at least one function coefficient for optimizing said determined statistical distribution;

said pixel processor, in response to a control signal from said controller, modifying said controllable function using said at least one function coefficient; wherein said controllable function is a remapping function and said at least one function coefficient is a lookup value.

13. The apparatus of claim 12, further comprising:

a motion detector, receiving said image stream at an input and producing an indicium of detected motion at an output, said motion detector identifying pixels within said image stream that represent motion within the image; and a priority adjuster, coupled to said motion detector, for emphasizing the statistical significance of said pixel characteristics associated with said pixels within said image stream that represent motion within the image.

14. The apparatus of claim 12, wherein said controller generates said one or more function coefficients by sequentially adding to an accumulator a determined pixel count representative of the number of pixels having a color saturation level from a first color saturation level to said Nth color saturation level, said controller generating a function coefficient during each sequential addition by dividing the accumulated total by N.

15. Apparatus for contrast-enhancing a digital video signal, said digital video signal comprising a sequence of picture elements (pixels), each of said pixels having an associated intensity level, said apparatus comprising:

a pixel processor, receiving said digital video signal at an input, and in response to each received pixel providing at an output a pixel having an intensity level derived from a lookup table, said lookup table having one element representing each of N possible intensity levels; and a controller, coupled to said pixel processor and receiving said digital video signal at an input, said controller statistically determining a luminance profile of said digital video signal, adjusting said statistically determined luminance profile to provide an enhanced contrast luminance profile, and coupling said enhanced contrast luminance profile to said pixel processor;

said pixel processor selectively adjusting said lookup table elements in response to said enhanced contrast luminance profile;

said controller statistically determining said luminance profile of said digital video signal by counting the number of M pixels having each of said N possible intensity levels; and said controller generates said one or more function coefficients by sequentially adding to an accumulator a determined pixel count representative of the number of pixels having an intensity level from a first intensity level to said Nth intensity level, said controller generating a function coefficient during each sequential addition by dividing the accumulated total by N.

16. The apparatus of claim 15, further comprising:

a motion detector, coupled to said controller, for determining which pixels represent motion in the image;

said pixel processor emphasizing the statistical significance of said pixel characteristics associated with pixels representing motion in the image.

* * * * *